United States Patent [19]
Koski

[11] Patent Number: 5,929,763
[45] Date of Patent: Jul. 27, 1999

[54] LIQUID LEVEL DETECTION APPARATUS WITH FLEXIBLE OUTER HOUSING

[75] Inventor: Richard D. Koski, Troy, Mich.

[73] Assignee: Patriot Sensors and Controls, Clawson, Mich.

[21] Appl. No.: 08/883,970

[22] Filed: Jun. 27, 1997

[51] Int. Cl.$^6$ .................................................. G08B 21/00
[52] U.S. Cl. .................. 340/618; 340/624; 324/207.21; 73/314; 73/319
[58] Field of Search ................................. 340/618, 623, 340/624, 612, 693.5; 324/207.13, 207.21, 207.24; 73/313, 314, 319

[56] References Cited

U.S. PATENT DOCUMENTS

| | | | |
|---|---|---|---|
| 4,678,993 | 7/1987 | Vinnemann et al. | 324/207.13 |
| 4,939,457 | 7/1990 | Tellerman | 324/207.13 |
| 4,943,773 | 7/1990 | Koski et al. | 324/207.13 |
| 4,958,332 | 9/1990 | Tellerman | 367/140 |
| 5,017,867 | 5/1991 | Dumais et al. | 324/207.13 |
| 5,050,430 | 9/1991 | Begin et al. | 73/292 |
| 5,076,100 | 12/1991 | Hunter et al. | 73/290 V |
| 5,136,884 | 8/1992 | Lovett | 73/313 |
| 5,196,791 | 3/1993 | Dumais | 324/207.13 |
| 5,258,707 | 11/1993 | Begin et al. | 324/207.13 |
| 5,274,328 | 12/1993 | Begin et al. | 324/207.12 |
| 5,313,160 | 5/1994 | Gloden et al. | 324/207.13 |
| 5,406,200 | 4/1995 | Begin et al. | 324/207.12 |
| 5,412,316 | 5/1995 | Dumais et al. | 324/207.13 |
| 5,473,245 | 12/1995 | Silvus, Jr. et al. | 324/207.13 |
| 5,627,380 | 5/1997 | Crowne | 250/577 |
| 5,680,041 | 10/1997 | Begin | 324/207.13 |
| 5,714,881 | 2/1998 | Begin | 324/207.13 |
| 5,723,870 | 3/1998 | Crowne et al. | 250/577 |
| 5,729,131 | 3/1998 | Begin | 324/207.13 |
| 5,804,961 | 9/1998 | Castillo et al. | 324/207.13 |

*Primary Examiner*—Jeffery A. Hofsass
*Assistant Examiner*—Sihong Huang
*Attorney, Agent, or Firm*—Young & Basile, P.C.

[57] ABSTRACT

A liquid level detection apparatus has an outer semi-rigid, flexible tube closely surrounding an inner, non-permeable tube containing a magnetostrictive wire. The outer tube prevents collapse of the inner tube during bending and flexing of the inner tube to enable the inner tube to be bent or coiled during storage, shipping, and installation.

15 Claims, 4 Drawing Sheets

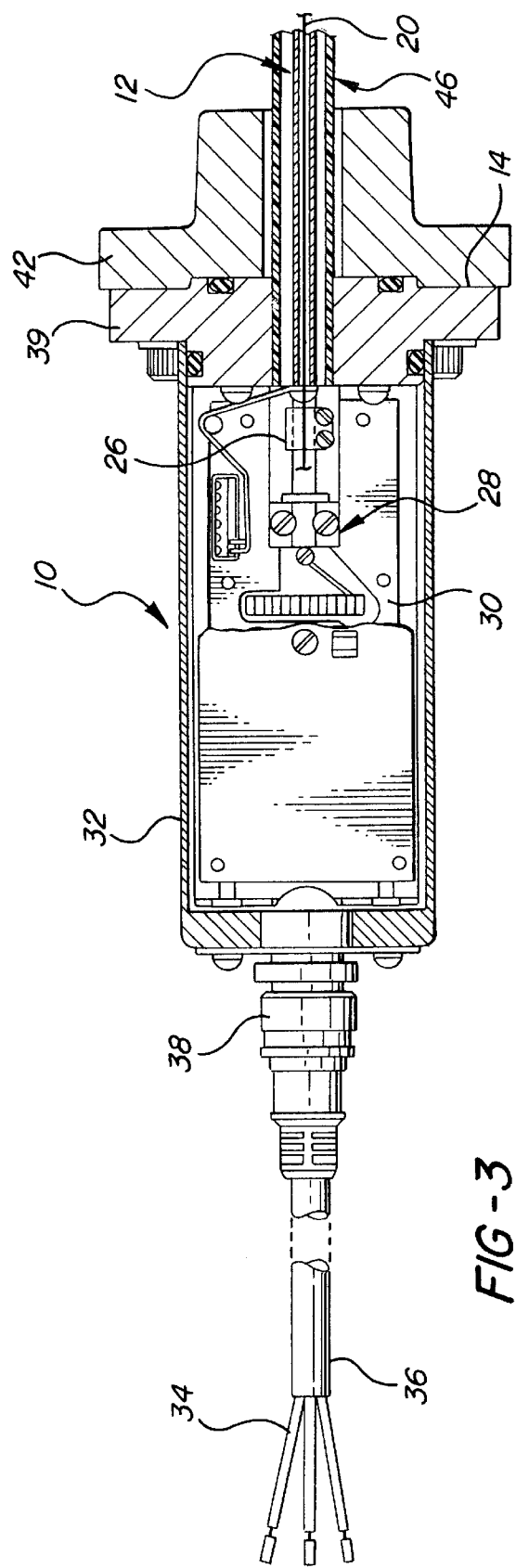

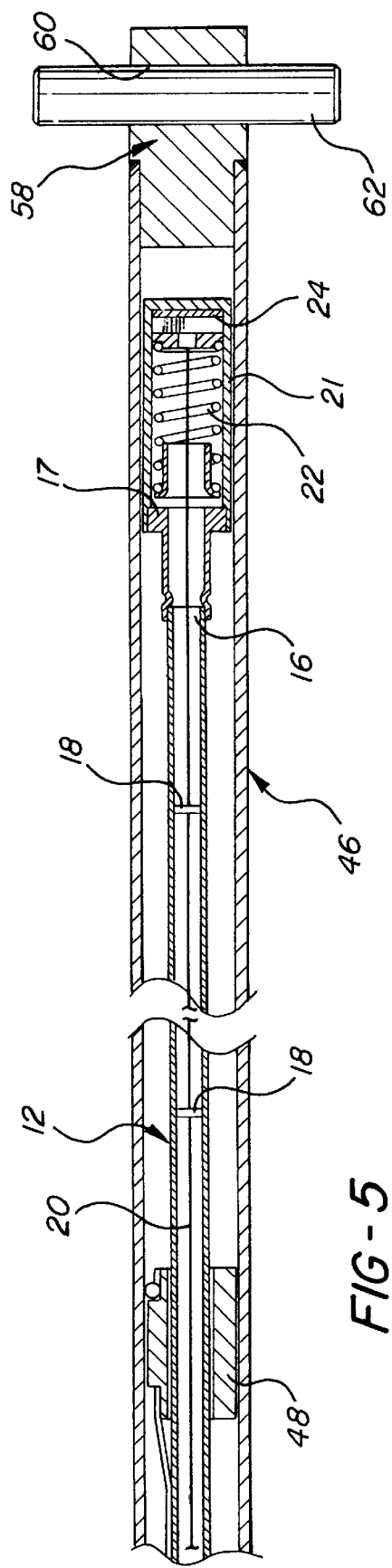
FIG-5
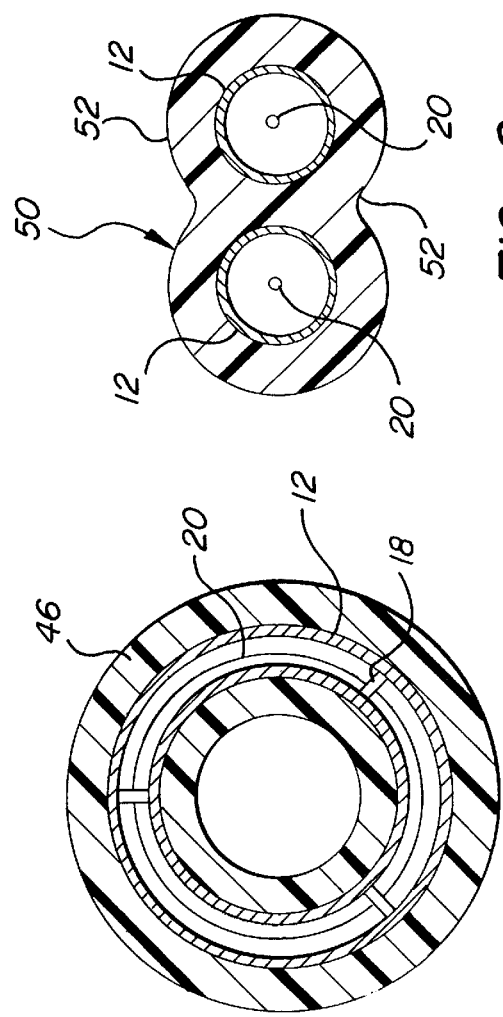
FIG-8
FIG-7
FIG-6

LIQUID LEVEL DETECTION APPARATUS WITH FLEXIBLE OUTER HOUSING

FIELD OF THE INVENTION

The present invention relates, in general, to magnetostrictive position transducers.

BACKGROUND OF THE INVENTION

The phenomenon of magnetostriction has been widely employed in linear distance and position measuring devices. A magnet located near or around a magnetostrictive wire marks the location to be measured. Such devices can operate with either mechanical or electrical excitation. When an acoustical/mechanical strain propagating along the wire reaches the area of influence of the magnet, an electrical signal is generated in the wire. Conversely, when an electrical signal propagating along the wire reaches the area of influence of the magnet, a torsional strain is generated in the wire.

Such linear position detectors using a magnet mounted in a float have been utilized as liquid level detectors to provide an indication of a level of liquid within a tank, such as an underground tank. The position of the magnet, and hence, the liquid level, is determined as a function of time required for a torsional disturbance to propagate from one end of the wire through the area of influence of the magnet, in the case of mechanical excitation, or from the position of the magnet to a sensing apparatus located at one end of the wire in the case of electrical excitation.

Other types of magnetostrictive position measuring devices utilize a reflective termination at the foot end of the magnetostrictive wire. Such devices measure the difference between the propagation times of a pulse from the magnet position to the foot of the wire and reflected back to the head of the device and a pulse traveling on the wire directly from the magnet to the head.

As shown in U.S. Pat. Nos. 4,839,590; 5,017,867; 5,050,430; and 5,253,521, all of which are assigned to the assignee of the present invention, such magnetostrictive devices include an elongated, small diameter tube, typically made of stainless steel, on which a movable magnet is mounted for providing an indication of a liquid level. A head and cap are mounted on one end of the tube, typically above the liquid level, and enclose electronic components, such as terminal connections and a signal conditioning circuit used to supply or output signals to and from the magnetostrictive wire in the tube.

Some liquid level detection applications require probe lengths of more than 20 feet. Since such probes are typically constructed of a rigid brass or stainless steel tube, the length of the tube creates significant problems with respect to storage, shipping and installation of the probes. The long, straight probes make it difficult to install the probe in confined areas lacking sufficient clearance above the tank for insertion of the probe through a port in the tank. Additional problems are encountered when installing such long length probes in large above-ground tanks. Such tanks require the installer to carry the probe up a ladder on the exterior of the tank and then to insert the long probe through an opening in the top of the tank.

It is known to construct liquid level detection apparatus or probes with a flexible housing in the form of a magnetostrictive wire mounted within a flexible, plastic outer tube. However, the use of a flexible outer plastic tube does not meet the requirement of non-permeability to fluids. The use of plastic outer housings has resulted in the ingress of toxic, corrosive, and/or explosive fluids into the interior of the housing which interfere with the timed propagation of signals along the magnetostrictive wire.

Thus, it would be desirable to provide a liquid level detection apparatus having a flexible, non-permeable probe housing which permits long length probes to be easily installed in confined areas around tanks and, also, to be easily handled during storage, shipment, and installation.

SUMMARY OF THE INVENTION

The present invention is a liquid level detection apparatus which includes a magnetostrictive wire disposed within a magnetic transmissive, non-permeable tube. Pickup means are coupled to the magnetostrictive wire for outputting signals propagating along the magnetostrictive wire. Circuit means are coupled to the magnetostrictive wire for transmitting electrical signals to the magnetostrictive wire and the pickup means. Finally, means surround the magnetic transmissive tube for preventing collapse of the magnetic transmissive tube during bending and coiling of the magnetic transmissive tube.

Preferably, the means for preventing collapse of the typically metal magnetic transmissive tube is in the form of an outer disposed tube having an inner diameter disposed in close proximity to the magnetic transmissive tube. The outer tube may be closely spaced from the metal tube or disposed in registry with the metal tube.

The outer tube is preferably formed of a semi-rigid, flexible material such as various plastic materials. Preferably, the outer tube is formed of a vinylidene fluoride.

A weight is releasably attachable to the distal end of the outer tube to maintain the outer tube and the inner disposed metal tube and magnetostrictive wire in an elongated, generally straight or linear configuration when installed within a tank.

The unique liquid level detection apparatus of the present invention provides a unique bending and coiling capability to previously devised liquid level detection apparatus utilizing a magnetostrictive wire disposed within a magnetic transmissive brass or stainless steel tube. The outer tube which closely surrounds or is disposed in registry with the inner metal tube supports the metal tube and prevents collapse of the metal tube during bending and coiling. In essence, the outer tube acts as a bending device to prevent creasing or collapse of the inner metal tube and to maintain the inner metal tube in a generally hollow, circular cross-section during bending and flexing.

The ability to easily bend, coil or otherwise flex the inner metal tube enables the entire liquid level detection apparatus to be easily stored and shipped in a small overall size, and easily installed, particularly in applications requiring long probe lengths greater than 20 feet. The releasable long weight attached to one end of the outer tube provides a force to maintain the outer tube in a generally linear or straight configuration after installation in a tank.

BRIEF DESCRIPTION OF THE DRAWINGS

The various features, advantages and other uses of the present invention will become more apparent by referring to the following detailed description and drawing in which:

FIG. 3 is a cross-sectional view generally taken along line 3—3 in FIG. 1;

FIG. 4 is a side elevational view of the float(s) and weight mounted on the liquid level detection apparatus shown in FIG. 2;

FIG. 5 is a cross-sectional view generally taken along line 5—5 in FIG. 4;

FIG. 6 is a partial, cross-sectional view shown another embodiment of the liquid level detection apparatus of the present invention;

FIG. 7 is a partial, cross-sectional view showing the liquid level detection apparatus of FIG. 6 in a partially coiled position; and FIG. 8 is a cross-sectional, end view of another embodiment of a liquid level detection apparatus according to the present invention.

DESCRIPTION OF THE PREFERRED EMBODIMENT

Figure 1:
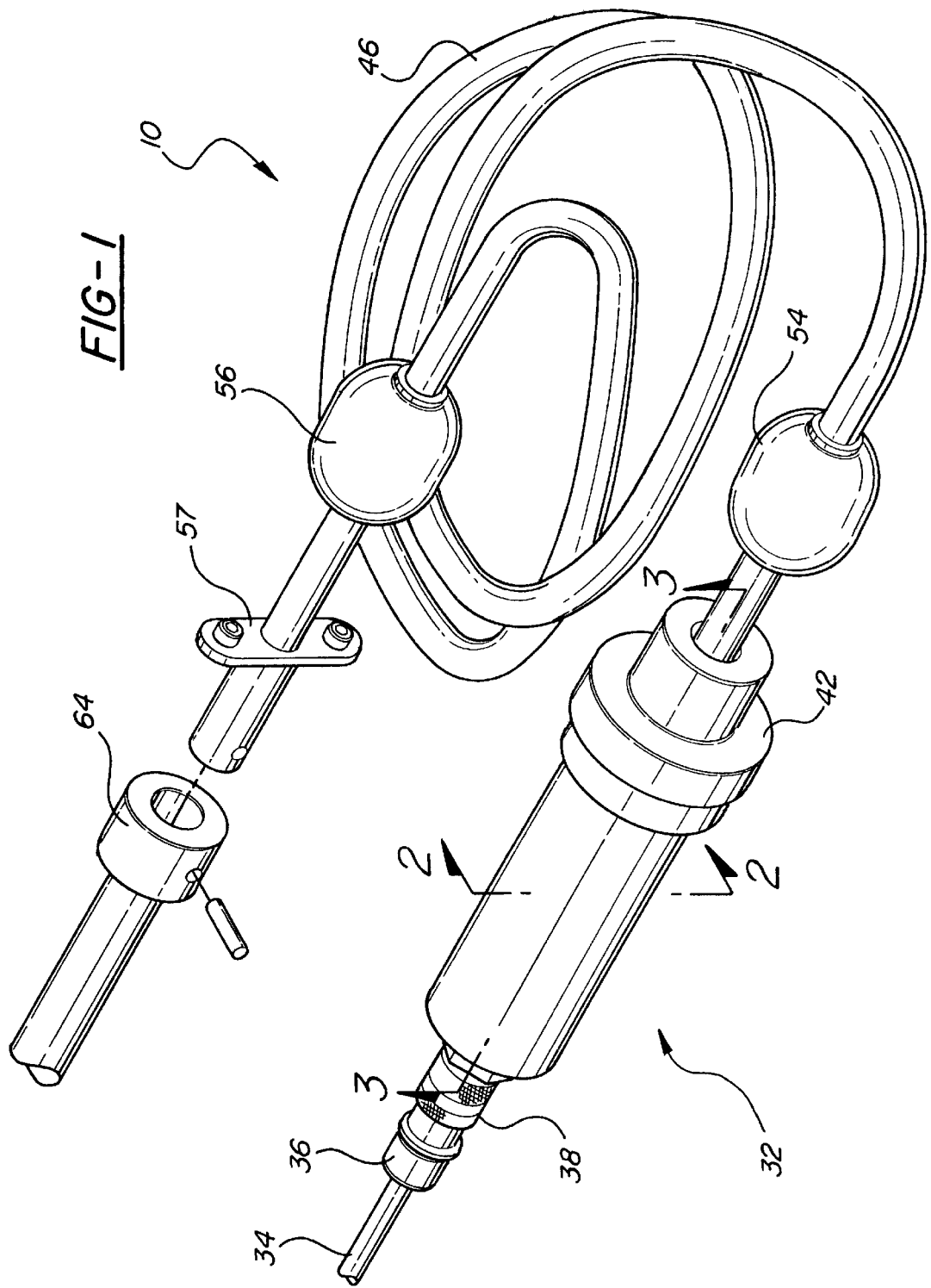
FIG. 1 is a perspective view of a liquid level detection apparatus constructed in accordance with the teachings of the present invention.

Referring now to the drawing, and to FIGS. 1–5 in particular, there is depicted a liquid level detection apparatus 10 constructed in accordance with the teachings of one embodiment of the present invention.

The liquid level detection apparatus 10 is conventionally mountable through an aperture in the top of a tank, not shown, and secured to the tank by suitable fasteners or brackets to dispose the top end of the liquid level detection apparatus 10 below, but generally in close proximity to the top cover of the tank.

As shown in FIG. 5, the liquid level detection apparatus 10 includes a tube 12 of substantially constant diameter between the first end 14 and a second end 16. The tube 12 is provided in any required length between the first and second ends 14 and 16 depending upon the overall size of the tank in which the liquid level detection apparatus 10 is to be employed. The tube 12 is formed of a suitable magnetically transmissive or non-magnetic material which is non-permeable. For example, brass, stainless steel and even plastic materials, may be used to form the tube 12.

A plurality of annular spacers 18 are spaced along the length of the tube 12 and are formed of a magnetic transmissive material, such as plastic, brass, etc. The spacers 18 support a wire 20 within the tube 12. The wire 20 is preferably a wire having magnetostrictive characteristics, such as a wire formed of a nickel/iron alloy. A material known as Ni-Span-C is suitable for use as the magnetostrictive wire 20.

One end of the wire 20 extends through an eyelet 16 into an end cap 21 fixedly mounted by welding in the second end 17 of the tube 12. A biasing means, such as compression spring 22, is mounted within the end cap 21 and exerts a biasing force on the wire 20 to maintain the wire 20 in a straight, elongated form within the tube 12. The end of the wire 20 is connected to a suitable termination 24 within the end cap 21. Reflective terminations, such as the terminations shown in U.S. Pat. Nos. 5,253,521 and 5,017,867, may be employed to connect the end of the wire 20 to the end 16 of the tube 12. The end cap 21 has a closed end to sealing enclose the second end of the tube 12.

Figure 2:
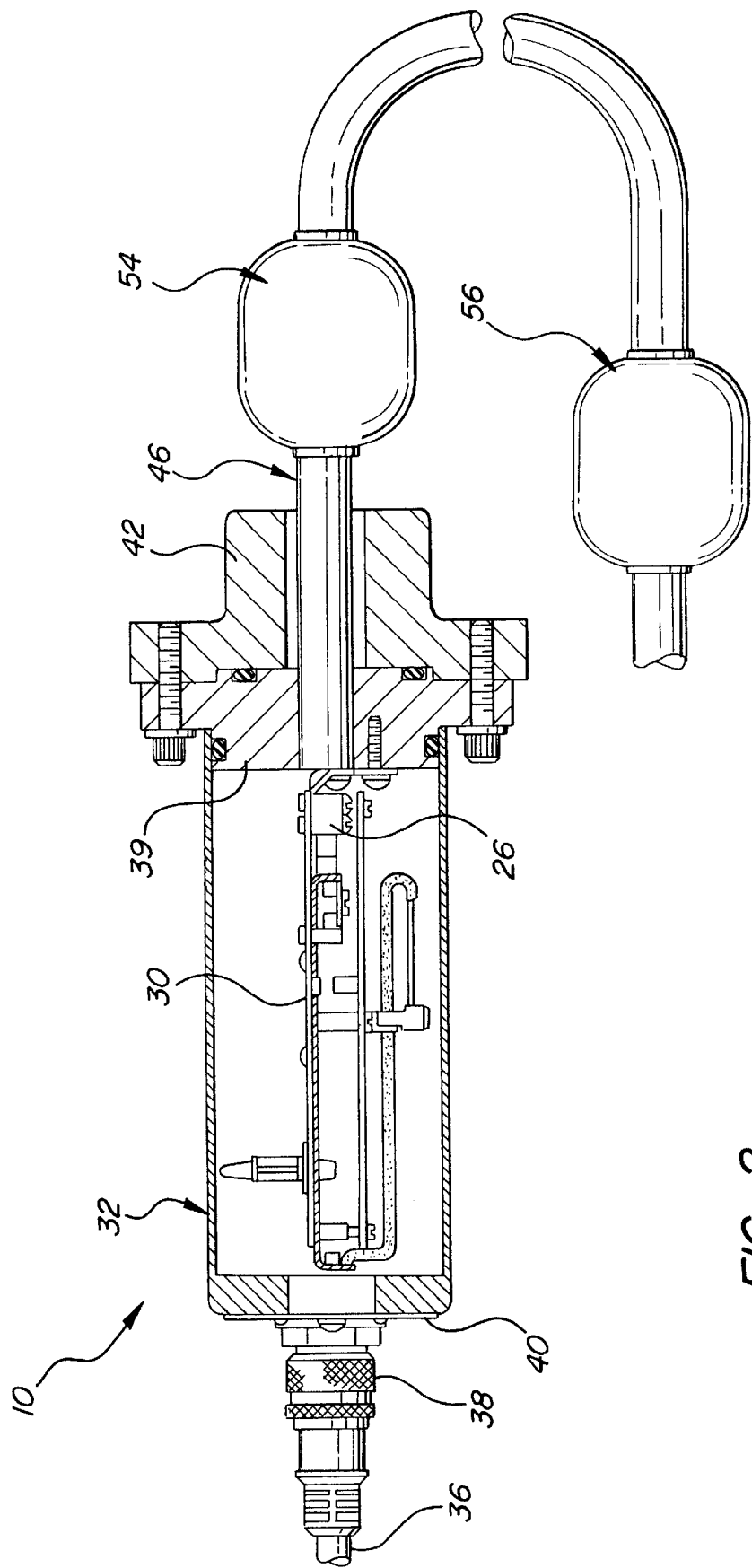
FIG. 2 is a cross-sectional view generally taken along line 2—2 in FIG. 1.

The other end of the wire 20 passes through a signal pickup means 26 to a fixed termination or anchor 28 on a support or printed circuit board 30. The pickup 26 and printed circuit board 30, which also contains suitable processing circuits, are mounted within a housing 32. The circuit board 30 and components mounted thereon and shown in FIGS. 2 and 3 are by way of example as any conventional circuit used with magnetostrictive wire level detectors can be employed. Further, the printed circuit board 30 can be mounted within the inner diameter of the tube 12.

As is conventional, and described in U.S. Pat. No. 5,050, 430, for example, a small rectangular piezoelectric crystal can be clamped to one end of the wire 20. The piezoelectric electric crystal operates as a transducer such that when a voltage is applied across the faces of the crystal by means of signal wires attached to the crystal, the crystal expands longitudinally or in a direction transverse to the length of the wire 20. This imparts a localized torsional strain in the wire 20 which propagates along the wire 20. Conversely, torsional movement of the wire 20 imparts a strain to the crystal which produces a voltage pulse on output leads.

Alternately, the pickup 26 is a coil mounted on the printed circuit board 30 and surrounding the wire 20. The coil 26 is responsive to a magnetic pulse which accompanies the sonic pulse on the wire 20 to product an electrical output pulse.

Two conductors extend from the pickup means 26 for conducting signals externally from the housing 32. A single return conductor, not shown, is connected to one end of the wire 20 and to the tube 12.

The conductors extending from the pickup means 26, the wire 20 and the return wire are connected to suitable terminals on the circuit board 30. Two or more conductors 34, typically in a multiconductor cable 36, pass through a cable connector 38 mounted on one end of the housing 32 to a remote controller or external circuit. The conductors 34 may form a two-wire loop which provides a current output when a voltage is applied thereto to indicate the position of a magnet along the length of the tube 12. Alternately, the two conductors 34 may be used to provide an output pulse signal indicative of the propagation time of the induced signal along the magnetostrictive wire 20.

As shown in FIGS. 1–3, the housing 32 receives a base 39 at one end and has an opposite end closed by an end cap or cover 40. An adapter 42 is secured to the base 39 and provides a suitable support for mounting the entire liquid level detection apparatus 10 in a tank, not shown.

According to the present invention and shown in detail in FIGS. 1–5, an outer sheath or tube 46 surrounds the tube 12 and the magnetostrictive wire 20. In a single tube 12 and wire 20 application, the outer tube 46 typically will concentrically surround the tube 12 for the entire length of the tube 12 as shown in FIGS. 1 and 5.

Preferably, the tube 46 is formed of a magnetically transmissive material which is semi-rigid so as to be bendable or flexible. For example, suitable plastics may be used to form the tube 46, such as a vinylidene fluoride sold commercially under the trademark "KYNAR" or an ethylene, tetrafluoroethylene sold commercially under the trademark "TEFLON." Other polyethylenes or polypropylenes may also be used for the tube 46. The tube 46 is heat welded at one end to the base 38 to sealing close off the first end of the tube 12.

The semi-rigid, but bendable and flexible characteristics of the tube 46 enable the outer tube 46 to support the inner disposed tube 12 during bending and flexing of the tube 12 so as to prevent collapse, creasing, etc., of the tube 12 which could lead to cracks in the wall of the tube 12 which could allow the permeation of fluids into the interior of the tube 12.

The outer tube 46 is preferably disposed in close proximity to the outer diameter of the tube 12. In one embodiment shown in FIG. 5, the inner diameter of the outer tube 46 is spaced a short distance from the outer diameter of the inner disposed tube 12. This enables the mounting of a thermistor 48, by example, between the outer tube 46 and the inner tube 12. The small spaced arrangement shown in FIG. 5 permits controlled bending of the tube 12; but little flexibility for coiling of the tube 12 without the possibility of collapse or creasing of the tube 12.

Alternately, as shown in FIG. 6, the outer tube 46 can be disposed in direct registry with the outer diameter of the inner disposed tube 12. In this embodiment, the outer tube 46 completely supports the tube 12 and permits coiling of the tube 12, as shown in FIGS. 1 and 7, without collapse or creasing of the tube 12. Further, the outer tube 46, in the embodiment shown in FIG. 6, may be extruded over the tube 12 to form an integral tube assembly.

In yet another embodiment shown in FIG. 8, a single outer tube denoted by reference number 50 surrounds a plurality of spaced inner tubes 12, each supporting an internally disposed magnetostrictive wire 20. Two tubes 12 are shown in FIG. 8 by way of example only. The outer housing 50 is molded or otherwise disposed in registry with or spaced a short distance from all of the tubes 12 and make take any shape consistent with the spaced arrangement of the tubes 12. By example only, the outer tube 50 has generally circular end portions spaced apart by a pair of concave, centrally located recesses 52 disposed between the inner tubes 12.

Referring to FIGS. 1, 2 and 4, a first magnet/float assembly 54 is movably disposed about the outer tube 46. The float 54 rides along the surface of the liquid in a tank and positions the magnet contained therein movably along the length of the magnetostrictive wire 20 to create a disturbance in the signal transmitted along the wire 20 which can be detected and, by suitable circuitry and signal processing, provide an indication of the position of the float/magnetic assembly 54 and, thereby, the liquid level in the tank. A second optional interface float assembly 56 is also movably disposed about the exterior of the outer tube 46. A weight 57 can be attached to the second float 56 to change the specific gravity of the second float 56 as needed for a specific application.

The outer tube 46 terminates in a tube plug 58 shown in FIG. 5 which sealingly closes the end of the outer tube 46. A bore 60 is formed in the tube plug 58 and receives a keeper pin 62. The keeper pin 62 is also slidably disposable through a transverse bore formed in a generally cylindrical weight 64 for removably mounting the weight 64 to the tube plug 58. The weight 64 generates force to maintain the outer tube 46 in a generally linear form once the tube 46 and the entire liquid level detection apparatus 10 is mounted within a tank.

In summary, there has been disclosed a unique liquid level detection apparatus having a bendable outer tube surrounding an inner metal tube containing a magnetostrictive wire which completely supports the inner metal tube to prevent collapse of the metallic tube during bending and/or coiling of the metal tube. Since the metal tube can be bent or coiled, storage, shipping, and installation of the entire liquid level detection apparatus, particularly in applications requiring probe lengths greater than 20 feet, is simplified.

What is claimed is:

1. A magnetostrictive waveguide apparatus comprising:
a bendable, sealed magnetic transmissive tube;
a magnetostrictive wire disposed within the magnetic transmissive tube;
an outer tube disposed in surrounding relationship to the magnetic transmissive tube; and
the outer tube and the magnetic transmissive tube bendable from a non-linear configuration prior to installation to an extended, substantially linear use position, the outer tube maintaining the cross section of the magnetic transmissive tube substantially constant during movement between the non-linear and linear positions.

2. The apparatus of claim 1 wherein an inner diameter of the outer tube is disposed in close proximity to an outer diameter of the magnetic transmissive tube.

3. The apparatus of claim 1 wherein an inner diameter of the outer tube is disposed in registry with an outer diameter of the magnetic transmissive tube.

4. The apparatus of claim 1 further comprising:
a weight; and
means for attaching the weight to one end of the outer tube.

5. The apparatus of claim 4 wherein the attaching means includes means for releasably attaching the weight to the outer tube.

6. The apparatus of claim 1 wherein:
the magnetic transmissive tube is formed of a non-fluid permeable material.

7. The apparatus of claim 1 wherein the magnetic transmissive tube and the outer tube are bendable into at least one circular coil prior to installation.

8. The apparatus of claim 7 wherein the magnetic transmissive tube and the outer tube are flexible tubes.

9. The apparatus of claim 1 further comprising:
pickup means, coupled to the magnetostrictive wire, for outputting signals propagating along the magnetostrictive wire; and
circuit means, coupled to the magnetostrictive wire, for coupling electrical signals to the magnetostrictive wire and from the pickup means.

10. The apparatus of claim 1 wherein the outer tube is formed of a vinylidene fluoride.

11. The apparatus of claim 1 wherein the outer tube is formed of an ethylene tetrafluoroethylene co-polymer.

12. A magnetostrictive waveguide apparatus comprising:
a sealed magnetic transmissive tube;
a magnetostrictive wire disposed within the magnetic transmissive tube;
pickup means, coupled to the magnetostrictive wire, for outputting signals propagating along the magnetostrictive wire;
circuit means, coupled to the magnetostrictive wire for coupling electrical signals to the magnetostrictive wire and from the pickup means; and
an outer tube formed of a semi-rigid, flexible plastic material and surrounding the magnetic transmissive tube, the outer tube preventing collapse of the magnetic transmissive tube during bending of the magnetic transmissive tube.

13. The apparatus of claim 12 wherein the outer tube is formed of a vinylidene fluoride.

14. The apparatus of claim 12 wherein the outer tube is formed of an ethylene tetrafluoroethylene co-polymer.

15. A magnetostrictive waveguide apparatus comprising:
first and second sealed magnetic transmissive tubes;
a magnetostrictive wire disposed within each of the first and second magnetic transmissive tubes;
pickup means, coupled to the magnetostrictive wires, for outputting signals propagating along the magnetostrictive wires;
circuit means, coupled to the magnetostrictive wires, for coupling electrical signals to the magnetostrictive wires and from the pickup means; and
an outer tube surrounding both of the first and second magnetic transmissive tubes, the outer tube preventing collapse of the first and second magnetic transmissive tubes during bending of the first and second magnetic transmissive tubes.

\* \* \* \* \*